UNITED STATES PATENT OFFICE 2,675,343

EMULSION-FORMING LIQUID PRODUCT

Harold A. Clymer, Southampton, and Mary Cecelia Ginkiewicz, Philadelphia, Pa., assignors to Smith, Kline & French Laboratories, Philadelphia, Pa., a corporation of Pennsylvania No Drawing. Application December 18, 1951, Serial No. 262,342

5 Claims. (Cl. 167—82)

This invention relates to an emulsion-forming liquid product which, for example, is useful as a vehicle for antibiotic or other medicinal agents. More particularly, this invention relates to an anhydrous liquid preparation useful, for example, as a vehicle for water-unstable antibiotic or other medicinal agents which, upon admixture with water, readily emulsifies at room temperature to form a semi-solid with the water being the external, continuous phase of the emulsion.

This invention further relates to a method of preparing a semi-solid emulsified pharmaceutical preparation suitable for topical application to the skin, which preparation may contain an antibiotic or other medicinal agent. More particularly, this invention further relates to a method of preparing a semi-solid emulsified pharmaceutical preparation suitable for topical application to the skin, which preparation may contain an antibiotic or other medicinal agent, by admixture of the anhydrous liquid vehicle of this invention together with water at room temperature, using mild agitation.

It is well known that when it is desired to apply a therapeutic agent, such as an antibiotic, to a medium essentially aqueous in nature, as, for example, denuded or abraded skin, it is necessary for maximum liberation and penetration of the agent into tissue fluid that it be carried by an aqueous vehicle. Inasmuch as many antibiotics are quite unstable in water, such a requirement conflicts with the desideratum of a long shelf life. It will thus be apparent that the problem of providing a vehicle in which water-unstable agents will have high stability and which may be readily converted into an aqueous semi-solid pharmaceutical form suitable for topical application to the skin is a major one.

An object of this invention is to provide an anhydrous liquid vehicle which together with water can be readily emulsified at room temperature on mild agitation to form a semi-solid.

A further object of this invention is to provide an anhydrous liquid vehicle in which medicinal agents unstable in water may be stored and which may readily be converted to a semi-solid suitable for applying the medicinal agent to a medium essentially aqueous in nature, for example, non-intact skin.

An additional object of this invention is to provide a method of readily forming a water-miscible pharmaceutical preparation suitable for carrying a medicinal agent which is to be applied to a medium essentially aqueous in nature.

These and other objects of this invention will become apparent from a reading of the following description.

The vehicle of the invention comprises an anhydrous liquid and an emulsifier which together with water will form on mild agitation at room temperature a stable semi-solid emulsion with the water being the external phase. The anhydrous liquid component of the vehicle is so selected that upon admixture of the vehicle with mild agitation with water at room temperature, a semi-solid of suitable consistency will be formed. The anhydrous liquid component is further so selected that upon admixture of the vehicle of this invention with water, the water comprises the external, continuous phase of the emulsified product.

The anhydrous liquid component is lauryl alcohol or a liquid ester of lauric acid. The alcohol portion of the ester is selected from lower alkylene glycols or di- lower alkylene glycols. Propylene glycol monolaurate or diethylene glycol monolaurate are exemplary.

When desired, thickening agents selected from higher alcohols having from 10-18 carbon atoms, such as, for example, decyl alcohol, myristyl alcohol, cetyl alcohol or stearyl alcohol may be added to the anhydrous liquid vehicle of the invention in order that, when it is combined with water, the resulting emulsified product will have optimal consistency.

The emulsifier in the vehicle of the invention is a liquid or solid polyoxyethylene sorbitan derivative of a fatty acid, as, for example, polyoxyethylene sorbitan monostearate, polyoxyethylene sorbitan monolaurate, or polyoxyethylene monopalmitate. Where the polyoxyethylene sorbitan derivative is a solid, it will be dissolved in the anhydrous liquid component.

The percentage of the constituents of the anhydrous liquid vehicle of the invention may vary within wide ranges. Generally speaking, however, it is preferred that the emulsifier be about equal in weight to the anhydrous liquid component of the vehicle.

The vehicle of this invention will be prepared by mixing together the anhydrous liquid component and the emulsifier at room temperature with mild agitation. Thickening agents may be added if desired. The dispersion of the ingredients may be facilitated by heating the mixture to a temperature of about 60° C.

A solid emulsion having its external phase consisting of water can be formed now by taking a liquid vehicle prepared in accordance with the above description and adding water with mild agitation.

The amount of water used may vary widely depending upon the consistency which is desired in the final emulsified product. A satisfactory consistency is usually achieved where the water comprises 30–65 per cent. by weight of the final emulsified product.

A medicinal agent may be added to the anhydrous liquid vehicle and stored therein before the emulsion is formed. This is a particularly satisfactory method for storing a medicinal agent unstable in water and desirably applied in emulsion form. Again, the medicinal agent may be added separately at the time of preparation of the final emulsified product or it may be dissolved or suspended in the water before admixture of the water with the anhydrous vehicle of the invention to form the final emulsified product.

Exemplary of compatible medicinal agents which may be utilized with the liquid vehicle of this invention and together admixed with water according to the method of this invention to form an emulsified semi-solid product are bacitracin, streptomycin, polymyxin and urea peroxide.

When desired, a plasticizer or humectant may be added as indicated to the vehicle of this invention to improve the cosmetic properties of the final emulsified product. It may further be desirable when indicated to add appropriate buffers to preserve the stability of the antibiotic or other medicinal agent.

The following examples are illustrative:

Example 1

A highly effective preparation was made up according to the following formula:

| | Gms. |
|---|---|
| Lauryl alcohol | 16 |
| Polyoxyethylene sorbitan monostearate [Tween 60 viscosity 500 cp. at 25° C. specific gravity 1.07] | 16 |

The lauryl alcohol and polyoxyethylene sorbitan monostearate were mixed together by mild agitation at room temperature to form a vehicle in accordance with this invention. On mixing the thus formed vehicle with 68 gms. of distilled water at room temperature a semi-solid emulsion was formed on mild agitation.

Example 2

| | Gms. |
|---|---|
| A highly effective preparation was made up according to the following formula: | |
| Lauryl alcohol mixture [1] | 16 |
| Polyoxyethylene sorbitan monostearate [Tween 60 viscosity 500 cp. at 25° C. specific gravity 1.07] | 16 |

[1] Lauryl alcohol mixture consisted of:
61% lauryl alcohol
2.5% decyl alcohol
23.5% myristyl alcohol
11% cetyl alcohol
2% stearyl alcohol
by weight of the mixture.

The vehicle in accordance with the invention was prepared by mixing together the lauryl alcohol mixture and the polyoxyethylene sorbitan monostearate at room temperature with mild agitation. On mixing the thus formed vehicle with 68 gms. of distilled water at room temperature a semi-solid emulsion was readily formed by mild agitation.

Example 3

A highly effective preparation was made up according to the following formula:

| | Gms. |
|---|---|
| Propylene glycol monolaurate | 16 |
| Polyoxyethylene sorbitan monolaurate [Tween 20 viscosity 350 cp. at 25° C. specific gravity 1.10] | 16 |
| Cetyl alcohol | 2 |

The vehicle in accordance with this invention was prepared by mixing together the propylene glycol monolaurate, the cetyl alcohol and the polyoxyethylene sorbitan monolaurate and heating the resulting mixture to 60° C. An emulsion was readily formed on the addition of 66 gms. of distilled water on mild shaking at room temperature. The emulsion was in the form of a semi-solid.

Example 4

A highly effective preparation was made up according to the following formula:

| | Gms. |
|---|---|
| Lauryl alcohol mixture [1] | 16 |
| Polyoxyethylene sorbitan monostearate [Tween 60 viscosity 600 cp. at 25° C. specific gravity 1.1] | 16 |

[1] Lauryl alcohol mixture consisted of:
61% lauryl alcohol
2.5% decyl alcohol
23.5% myristyl alcohol
11% cetyl alcohol
2% stearyl alcohol
by weight of the mixture.

The lauryl alcohol mixture was combined with the polyoxyethylene sorbitan monostearate to form the anhydrous vehicle according to this invention. The final emulsified semi-solid product was formed by the addition of 68 gms. of distilled water with agitation by mild shaking at room temperature.

Example 5

A highly effective preparation was made up according to the following formula:

| | Gms. |
|---|---|
| Lauryl alcohol | 16 |
| Polyoxyethylene sorbitan monopalmitate [Tween 40 viscosity 450 cp. at 25° C. specific gravity 1.06] | 16 |

The lauryl alcohol and the polyoxyethylene sorbitan monopalmitate were mixed together by mild agitation at room temperature to form the vehicle in accordance with this invention. The thus formed vehicle was converted in the form of a semi-solid emulsion by the addition of 68 gms. of water at room temperature with mild agitation.

Example 6

A highly effective preparation was made up according to the following formula:

| | Gms. |
|---|---|
| Lauryl alcohol | 16 |
| Polyoxyethylene sorbitan monostearate [Tween 60 viscosity 500 cp. at 25° C. specific gravity 1.07] | 16 |
| Streptomycin | 0.05 |
| Distilled water q. s | 100 |

The lauryl alcohol and polyoxyethylene sorbitan monostearate were mixed together by mild agitation at room temperature to form a vehicle in accordance with this invention. A shelf product was prepared from this vehicle by addition thereto of the streptomycin, which shelf product was found to be highly stable. The above shelf product was converted to the form of a semi-solid emulsion of a consistency suitable for application to the skin by the addition of water at room temperature with mild agitation. Emulsification occurred with the streptomycin being largely in solution in the external aqueous phase.

Example 7

A highly effective preparation was made up according to the following formula:

| | |
|---|---|
| Lauryl alcohol mixture [1] _____gms__ | 16 |
| Polyoxyethylene sorbitan monostearate [Tween 60 viscosity 500 cp. at 25° C. specific gravity 1.07]_____gms__ | 16 |
| Bacitracin _____units__ | 500,000 |
| Acetic acid_____gms__ | 0.13 |
| Distilled water q. s_____gms__ | 100 |

[1] Lauryl alcohol mixture consisted of:
61% lauryl alcohol
2.5% decyl alcohol
23.5% myristyl alcohol
11% cetyl alcohol
2% stearyl alcohol
by weight of the mixture.

The vehicle in accordance with this invention was prepared by mixing together the lauryl alcohol mixture and polyoxyethylene sorbitan monostearate at room temperature with mild agitation.

When it was desired to dispense the final emulsified product, the bacitracin together with the acetic acid was dissolved in the water and the resulting solution was added to the anhydrous liquid vehicle with agitation and mild shaking at room temperature. The resulting emulsion contained the bacitracin dissolved in the aqueous phase of the emulsified semi-solid product.

Example 8

A highly effective preparation was made up according to the following formula:

| | |
|---|---|
| Propylene glycol monolaurate__gms__ | 16 |
| Polyoxyethylene sorbitan monolaurate [Tween 20 viscosity 350 cp. at 25° C. specific gravity 1.10]_____gms__ | 16 |
| Cetyl alcohol_____gms__ | 2 |
| Polymyxin _____units__ | 2,000,000 |
| Distilled water q. s_____gms__ | 100 |

The vehicle in accordance with this invention was prepared by mixing together the propylene glycol monolaurate, the cetyl alcohol and the polyoxyethylene sorbitan monolaurate and heating the resulting mixture to 60° C.

When it was desired to dispense the final emulsified product, the polymyxin was dissolved in the water and the resulting solution was added to the anhydrous liquid vehicle with agitation and mild shaking at room temperature. The resulting emulsion contained the polymyxin dissolved in the aqueous phase of the emulsified semi-solid product.

Example 9

A highly effective preparation was made up according to the following formula:

| | Gms. |
|---|---|
| Lauryl alcohol mixture [1] _____ | 16 |
| Polyoxyethylene sorbitan monostearate [Tween 60 viscosity 600 cp. at 25° C. specific gravity 1.1]_____ | 16 |
| Urea peroxide_____ | 5 |
| Distilled water q. s_____ | 100 |

[1] Lauryl alcohol mixture consisted of:
61% lauryl alcohol
2.5% decyl alcohol
23.5% myristyl alcohol
11% cetyl alcohol
2% stearyl alcohol
by weight of the mixture.

The lauryl alcohol mixture was combined with the polyoxyethylene sorbitan monostearate to form the anhydrous liquid vehicle according to this invention.

The urea peroxide was dispersed in the anhydrous vehicle to form the suitable shelf product. The final emulsified semi-solid product was formed by the addition of distilled water with agitation by mild shaking at room temperature, the urea peroxide being dissolved in the aqueous phase of the emulsion.

Example 10

A highly effective preparation was made up according to the following formula:

| | Gms. |
|---|---|
| Lauryl alcohol_____ | 16 |
| Polyoxyethylene sorbitan monopalmitate [viscosity 450 cp. at 25° C. specific gravity 1.06] _____ | 16 |
| Streptomycin _____ | 0.05 |
| Distilled water q. s_____ | 100 |

The lauryl alcohol and polyoxyethylene sorbitan monopalmitate were mixed together by mild agitation at room temperature to form a vehicle in accordance with this invention. A shelf product was prepared from this vehicle by addition thereto of the streptomycin, which shelf product was found to be highly stable. The above shelf product was converted to the form of a semi-solid emulsion of a consistency suitable for application to the skin by the addition of water at room temperature with mild agitation. Emulsification occurred with the streptomycin being largely in solution in the external aqueous phase.

Example 11

A highly effective preparation was made up according to the following formula:

| | Gms. |
|---|---|
| Lauryl alcohol_____ | 18.00 |
| Polyoxyethylene sorbitan monostearate [Tween 60 viscosity 500 cp. at 25° C. specific gravity 1.07]_____ | 16.00 |

The lauryl alcohol and the polyoxyethylene sorbitan monostearate were mixed together by mild agitation at room temperature to form a vehicle in accordance with this invention. A semi-solid emulsion was readily formed on mixing the thus formed vehicle with 66 gms. of distilled water on agitation by shaking at room temperature.

Example 12

A highly effective preparation was made up according to the following formula:

| | Gms. |
|---|---|
| Lauryl alcohol mixture [1] _____ | 18.00 |
| Polyoxyethylene sorbitan monolaurate [Tween 20 viscosity 350 cp. at 25° C. specific gravity 1.10]_____ | 9.00 |

[1] Lauryl alcohol mixture consisted of:
61% lauryl alcohol
2.5% decyl alcohol
23.5% myristyl alcohol
11% cetyl alcohol
2% stearyl alcohol
by weight of the mixture.

The lauryl alcohol mixture and the polyoxyethylene sorbitan monolaurate were mixed together by mild agitation at room temperature to form a vehicle in accordance with this invention. A semi-solid emulsion was readily formed on mixing the thus formed vehicle with 73 gms. of distilled water on agitation by shaking at room temperature.

Example 13

The highly effective preparation was made up according to the following formula:

| | Gms. |
|---|---|
| Propylene glycol monolaurate | 16.00 |
| Polyoxyethylene sorbitan monostearate [Tween 60 viscosity 500 cp. at 25° C. specific gravity 1.07] | 16.00 |
| Cetyl alcohol | 2.00 |

The propylene glycol monolaurate and polyoxyethylene sorbitan monostearate were mixed together and heated to 60° C. to form a vehicle in accordance with this invention. A semi-solid emulsion was readily formed on mixing the thus formed vehicle with 66 gms. of distilled water on agitation by shaking at room temperature.

Example 14

A highly effective preparation was made up according to the following formula:

| | Gms. |
|---|---|
| Diethylene glycol monolaurate | 16.00 |
| Polyoxyethylene sorbitan monostearate [Tween 60 viscosity 500 cp. at 25° C. specific gravity 1.07] | 16.00 |
| Cetyl alcohol | 1.00 |

The diethylene glycol monolaurate and the polyoxyethylene sorbitan monostearate were mixed together and heated to 60° C. to form a vehicle in accordance with this invention. A semi-solid emulsion was readily formed on mixing the thus formed vehicle with 66 gms. of distilled water on agitation by shaking at room temperature.

Example 15

A highly effective preparation was made up according to the following formula:

| | Gms. |
|---|---|
| Lauryl alcohol mixture [1] | 14.0 |
| Polyoxyethylene sorbitan tristearate [Tween 65, a solid—specific gravity 1.04] | 14.0 |

[1] Lauryl alcohol mixture consisted of:
61% lauryl alcohol
2.5% decyl alcohol
23.5% myristyl alcohol
11% cetyl alcohol
2% stearyl alcohol
by weight of the mixture.

The lauryl alcohol mixture and the polyoxyethylene sorbitan tristearate were mixed together with mild heating to form a vehicle in accordance with this invention, the polyoxyethylene dissolving into the lauryl alcohol. A semi-solid emulsion was readily formed on mixing the thus formed vehicle with 72 gms. of distilled water on agitation by shaking at room temperature.

Example 16

A highly effective preparation was made up according to the following formula:

| | Gms. |
|---|---|
| Lauryl alcohol | 18.00 |
| Polyoxyethylene sorbitan monostearate [Tween 60 viscosity 500 cp. at 25° C. specific gravity 1.07] | 16.00 |
| Streptomycin | 0.05 |
| Distilled water q. s. | 100.00 |

The lauryl alcohol and polyoxyethylene sorbitan monostearate were mixed together by mild agitation at room temperature to form a vehicle in accordance with this invention. A shelf product was prepared from this vehicle by addition thereto of the streptomycin which shelf product was found to be highly stable. The above shelf product was converted to the form of a semi-solid emulsion of a consistency suitable for application to the skin by the addition of water at room temperature with mild agitation. Emulsification occurred with the streptomycin being largely in solution in the external aqueous phase.

Example 17

A highly effective preparation was made up according to the following formula:

| | | |
|---|---|---|
| Lauryl alcohol mixture [1] | gms | 18.00 |
| Polyoxyethylene sorbitan monolaurate [Tween 20 viscosity 350 cp. at 25° C. specific gravity 1.10] | gms | 9.00 |
| Bacitracin | units | 500,000 |
| Acetic acid | gms | 0.13 |
| Distilled water q. s. | gms | 100.00 |

[1] Lauryl alcohol mixture consisted of:
61% lauryl alcohol
2.5% decyl alcohol
23.5% myristyl alcohol
11% cetyl alcohol
2% stearyl alcohol
by weight of the mixture.

The vehicle in accordance with this invention was prepared by mixing together the lauryl alcohol mixture and polyoxyethylene sorbitan monolaurate at room temperature with mild agitation.

When it was desired to dispense the final emulsified product, the bacitracin together with the acetic acid was dissolved in the water and the resulting solution was added to the anhydrous liquid vehicle with agitation and mild shaking at room temperature. The resulting emulsion contained the bacitracin dissolved in the aqueous phase of the emulsified semi-solid product.

Example 18

A highly effective preparation was made up according to the following formula:

| | Gms. |
|---|---|
| Propylene glycol monolaurate | 16.00 |
| Polyoxyethylene sorbitan monostearate [Tween 60 viscosity 500 cp. at 25° C. specific gravity 1.07] | 16.00 |
| Cetyl alcohol | 2.00 |
| Urea peroxide | 5.00 |
| Distilled water q. s. | 100.00 |

The propylene glycol monolaurate, polyoxyethylene sorbitan monostearate and cetyl alcohol were mixed together and the resulting mixture heated to 60° C. to form a vehicle in accordance with this invention. After the mix cooled to room temperature, the urea peroxide was dispersed in the vehicle to form a highly satisfactory shelf product. An emulsified semi-solid product was formed by the addition of distilled water with agitation by mild shaking at room temperature, the urea peroxide being dissolved in the aqueous phase of the emulsion.

Example 19

A highly effective preparation was made up according to the following formula:

| | Gms. |
|---|---|
| Diethylene glycol monolaurate | 16.00 |
| Polyoxyethylene sorbitan monostearate [Tween 60 viscosity 500 cp. at 25° C. specific gravity 1.07] | 16.00 |
| Cetyl alcohol | 1.00 |
| Urea peroxide | 5.00 |
| Distilled water q. s. | 100.00 |

The diethylene glycol monolaurate, polyoxyethylene sorbitan monostearate and cetyl alcohol were mixed together and the resulting mixture heated to 60° C. to form a vehicle in accordance with this invention. After the mixture cooled to room temperature, the urea peroxide was dispersed in the vehicle to form a highly satisfactory shelf product. An emulsified semi-solid product was formed by the addition of distilled water with agitation by mild shaking at room temperature, the urea peroxide being dissolved in the aqueous phase of the emulsion.

Example 20

A highly effective preparation was made up according to the following formula:

| | Grams |
|---|---|
| Lauryl alcohol mixture [1] | 14.0 |
| Polyoxyethylene sorbitan tristearate [Tween 65, a solid—specific gravity 1.04] | 14.0 |
| Streptomycin | 0.05 |
| Distilled water q. s. | 100.0 |

[1] Lauryl alcohol mixture consisted of:
61% lauryl alcohol
2.5% decyl alcohol
23.5% myristyl alcohol
11% cetyl alcohol
2% stearyl alcohol
by weight of the mixture.

The lauryl alcohol mixture and the polyoxyethylene sorbitan tristearate were mixed together by mild agitation at room temperature. To the vehicle thus formed the streptomycin was added. The resulting product was found to be highly stable and readily converted to a semi-solid emulsion by the addition of the water at room temperature with mild agitation. The streptomycin was largely in solution in the external aqueous phase.

The applicants do not desire to be limited except as set forth in the appended claims.

This application is a continuation-in-part of application Serial No. 157,176, filed April 20, 1950.

What is claimed is:

1. A pharmaceutical carrier in which a medicinal agent can be stored and which on admixture with water is adapted to form a semi-solid emulsion at room temperature with mild agitation comprising, in admixture, a polyoxyethylene sorbitan fatty acid derivative and a member selected from the group consisting of lauryl alcohol and a liquid ester of lauric acid in which the alcohol portion of the ester is selected from the group consisting of lower alkylene glycols and di- lower alkylene glycols.

2. A pharmaceutical carrier in which a medicinal agent can be stored and which on admixture with water is adapted to form a semi-solid emulsion at room temperature with mild agitation comprising, in admixture, a polyoxyethylene sorbitan fatty acid derivative and a member selected from the group consisting of lauryl alcohol and a liquid ester of lauric acid in which the alcohol portion of the ester is selected from the group consisting of lower alkylene glycols and di- lower alkylene glycols and a thickening agent selected from the group consisting of higher alcohols having from 10–18 carbon atoms.

3. A pharmaceutical carrier in which a medicinal agent can be stored and which on admixture with water is adapted to form a semi-solid emulsion at room temperature with mild agitation comprising, in admixture, a polyoxyethylene sorbitan fatty acid derivative and a member selected from the group consisting of lauryl alcohol and a liquid ester of lauric acid in which the alcohol portion of the ester is selected from the group consisting of lower alkylene glycols and di- lower alkylene glycols and a medicinal agent.

4. A pharmaceutical carrier in which a medicinal agent can be stored and which on admixture with water is adapted to form a semi-solid emulsion at room temperature with mild agitation comprising, in admixture, a polyoxyethylene sorbitan fatty acid derivative and a member selected from the group consisting of lauryl alcohol and a liquid ester of lauric acid in which the alcohol portion of the ester is selected from the group consisting of lower alkylene glycols and di- lower alkylene glycols and an antibiotic agent which is unstable in water.

5. A pharmaceutical carrier in which a medicinal agent can be stored and which on admixture with water is adapted to form a semi-solid emulsion at room temperature with mild agitation comprising, in admixture, a polyoxyethylene sorbitan fatty acid derivative and a member selected from the group consisting of lauryl alcohol and a liquid ester of lauric acid in which the alcohol portion of the ester is selected from the group consisting of lower alkylene glycols and di- lower alkylene glycols, a thickening agent selected from the group consisting of higher alcohols having from 10–18 carbon atoms and a medicinal agent.

References Cited in the file of this patent

UNITED STATES PATENTS

| Number | Name | Date |
|---|---|---|
| 2,402,373 | Cordero | June 18, 1946 |
| 2,472,640 | Wilcox | June 7, 1949 |

OTHER REFERENCES

New and Nonofficial Remedies, 1949, page 291, J. P. Lippincott Company, Philadelphia, May 1949.

Halpern et al.: Journal American Pharmaceutical Association, Scientific Edition, April 1947, pages 101 to 104.

Drug and Cosmetic Emulsions, Atlas Powder Company, Wilmington, Delaware, 1947, pages 38, 39, 43 and 44.

The Pharmaceutical Journal, December 20, 1947, page 450.

Fiero, Journal American Pharmaceutical Association, Scientific Edition, February 1945, pages 56 to 59.

Atlas Surface Active Agents Pamphlet by Atlas Powder Company, Industrial Chemicals Department, Wilmington 99, Delaware, 1948, page 39.

Bhatia et al., Journal American Pharmaceutical Association, Prac. Pharm. Edition, July 1949, pages 410 to 412.